United States Patent [19]
Field, Jr. et al.

[11] 3,972,264
[45] Aug. 3, 1976

[54] HYDRAULICALLY ACTUATED DETENT MECHANISM

[75] Inventors: Jesse L. Field, Jr., Braidwood; Glen J. Medina, Joliet, both of Ill.

[73] Assignee: Caterpillar Tractor Co., Peoria, Ill.

[22] Filed: Dec. 16, 1974

[21] Appl. No.: 533,181

Related U.S. Application Data

[62] Division of Ser. No. 394,189, Sept. 4, 1973, Pat. No. 3,869,107.

[52] U.S. Cl.............................................. 91/358 A
[51] Int. Cl.² ..................... F15B 13/01; F15B 13/16
[58] Field of Search............ 91/358 A; 137/624.27; 214/762, 764

[56] References Cited
UNITED STATES PATENTS

| | | | |
|---|---|---|---|
| 2,689,585 | 9/1954 | Presnell | 137/624.27 |
| 2,862,518 | 12/1958 | McAlvay | 137/624.27 |
| 3,670,628 | 6/1972 | Borer et al. | 91/358 A |
| 3,721,160 | 3/1973 | Kittle | 137/624.27 |

*Primary Examiner*—Irwin C. Cohen
*Attorney, Agent, or Firm*—Phillips, Moore, Weissenberger Lempio & Strabala

[57] ABSTRACT

A hydraulically actuated detent mechanism for positioning an elongated spool in the bore of a control valve has circumferentially spaced apart, radial bores opening at their inner ends to the valve bore and having their outer ends in communication with a source of fluid pressure, a detent plunger arranged in each of the radial bores and tending to be urged into balanced detent engagement with axially spaced apart depressions in the spool by fluid pressure in the outer ends of the radial bores. Preferably, the detent mechanism also includes kickout means which are operable for releasing the spool from detent engagement through the introduction of fluid pressure into the inner ends of the radial bores.

4 Claims, 2 Drawing Figures

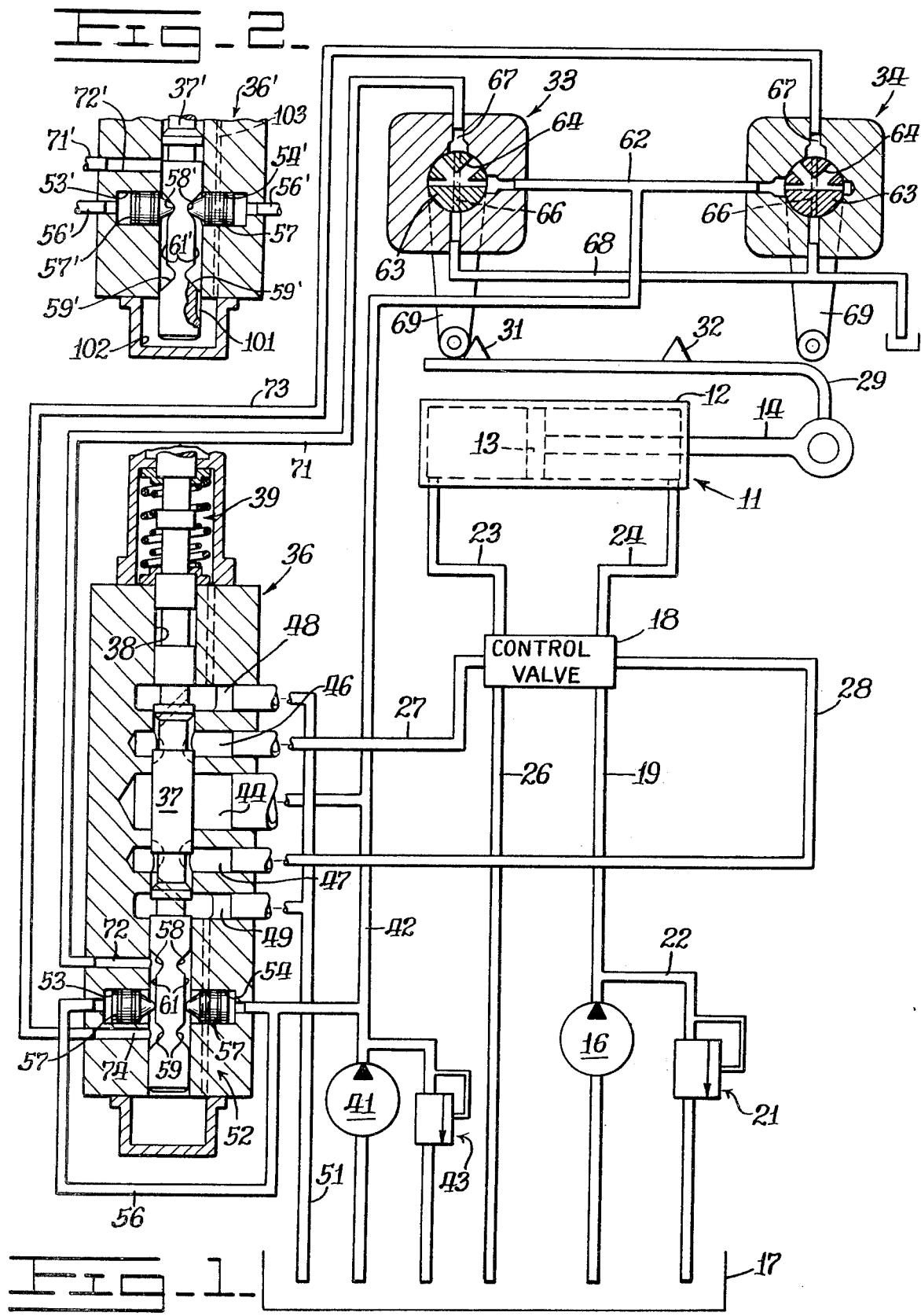

HYDRAULICALLY ACTUATED DETENT MECHANISM

This is a division, of Ser. No. 394,189, filed Sept. 4, 1973, now U.S. Pat. No. 3,869,107.

BACKGROUND OF THE INVENTION

The present invention relates to a detent mechanism of the type having a plurality of detent plungers arranged in circumferentially spaced apart relation for detent engagement with a valve spool.

Many hydraulic control valves employ detent mechanisms of the type generally contemplated by the present invention for maintaining the spool of the control valve in a preselected position. It is also common to employ a kickout device for releasing the detent mechanism and allowing the spool to be repositioned or to return to a neutral position.

Within such detent mechanisms, detent elements such as plungers or ball bearings are spring-loaded for resilient engagement with angular grooves or ridges in the control spool and thus tend to maintain the spool in one or more preselected positions. In many such valves, two or more detent elements are arranged in opposition to each other for balanced engagement with the spool. Detent arrangements of this type are intended to provide balanced forces acting upon the spool and thus allow freer travel of the spool in its bore.

However, even with such balanced arrangements, various factors still tend to result in side loading of the spool and thus interfere with movement of the spool in its bore. The most prevalent causes of unbalanced forces have been found to include manufacturing tolerances relating to both the valve body and spool as well as variations in the length and load rate for springs associated with different detent elements.

SUMMARY OF THE INVENTION

Accordingly, it is an object of the present invention to overcome one or more problems of the type described above through the use of a plurality of detent elements arranged for balanced interaction with a valve spool and being urged into detent engagement with the spool by means of a common fluid pressure.

It is a further object of the present invention to provide such a detent mechanism which also includes kickout means for selectively releasing the spool from detent engagement, the detent elements being hydraulically responsive to operation of the kickout means.

Additional objects and advantages of the present invention are made apparent in the following description having reference to the accompanying drawings.

BRIEF DESCRIPTION OF THE DRAWINGS

FIG. 1 is a generally schematic representation, with parts in section, of a hydraulic control circuit including a pilot control valve having a spool tending to be positioned by a detent mechanism constructed according to the present invention.

FIG. 2 is a fragmentary view, with parts in section, of a control circuit similar to that of FIG. 1 while representing another embodiment of the detent mechanism of the present invention.

DESCRIPTION OF THE PREFERRED EMBODIMENTS

A hydraulic control circuit of the type illustrated in FIG. 1 is particularly adapted for operation of a hydraulic motor such as the double-acting jack indicated at 11. The jack 11 includes a cylinder 12 having a piston 13 slidably arranged therein and a connecting rod 14 which penetrates one end of the cylinder 12. Hydraulic fluid under pressure for operating the jack 11 is provided by a pump 16 which draws fluid from a reservoir 17 and directs it to a control valve 18 through a conduit 19. A relief valve 21 arranged in a branched conduit 22 establishes operating fluid pressure in the conduit 19.

Fluid conduits 23 and 24 communicate the control valve 18 respectively with the head end and rod end of the cylinder 12. The control valve 18 is also in communication with the reservoir 17 through another conduit 26.

The control valve 18 is of a conventional type adapted for response to pilot fluid communicated thereto by pilot conduits 27 and 28. For example, when pilot fluid pressurizes the conduit 27, the control valve 18 communicates fluid under pressure from the conduit 19 to the head end of the cylinder 12 through the conduit 23 while the rod end of the cylinder is communicated to the reservoir 17 through the conduits 24 and 26. Similarly, the control valve 18 responds to pilot pressure in the conduit 28 for communicating fluid pressure from the conduit 19 toward the rod end of the cylinder through the conduit 24 while the head end of the cylinder is communicated to the reservoir through the conduits 23 and 26. In the absence of pilot pressure in either of the conduits 27 and 28, the control valve 18 tends to assume a neutral position with both ends of the cylinder 12 being hydraulically closed.

An actuator extension 29 of the rod 14 supports actuating cams 31 and 32 which are arranged to respectively engage rotary valves 33 and 34 for performing a kickout function in a manner described in greater detail below.

Pilot operation of the control valve 18 is regulated by a pilot control valve 36 which has an elongated spool 37 arranged for axial movement in a bore 38 to regulate the passage of pilot fluid thereacross. The spool 37 tends to be positioned in a neutral condition as illustrated in FIG. 1 by means of a conventional centering spring mechanism as indicated at 39.

Pilot fluid pressure is provided by a pump 41 which draws fluid from the reservoir 17 and communicates it through a pilot inlet conduit 42 wherein pressure is established by a relief valve 43. The pilot control valve 36 forms a number of fluid ports which are in communication with its valve bore 38 and with other components of the pilot control circuit. A centrally arranged inlet port 44 is in communication with a pilot inlet conduit 42. Pilot service ports or chambers 46 and 47 are axially spaced along the bore 38 on opposite sides of the inlet port 44 while being in respective communication with the control valve 18 through the conduits 27 and 28. Drain ports 48 and 49 are respectively spaced apart from the service ports 46 and 47 while being in communication with the reservoir 17 through a drain conduit 51.

A detent mechanism constructed according to the present invention is generally indicated at 52 for positioning the spool 37 within the bore 38. The detent mechanism comprises a pair of radially extending bores 53 and 54 which are arranged in circumferentially spaced or diametrically opposed relation to the bore 38. The inner ends of the radial bores 53 and 54 communicate with the axial bore 38 while the outer ends of the two radial bores are in common communication with pilot fluid pressure in the inlet conduit 42 by means of a branched conduit 56.

An elongated detent element or plunger 57 is slidably arranged within each of the radial bores and thus tends to be urged radially inwardly towards the spool 37 by means of fluid pressure entering the outer ends of the radial bores 53 and 54 from the common conduit 56. The tapered inner ends of the detent plungers 57 thus tend to enter into detent engagement with opposed sets of depressions or indentations 58 and 59 which are formed in axially spaced apart relation along the spool 37. The respective depressions 58 and 59 are located upon the spool 37 so that when they are engaged by the detent plungers 57, the pilot spool 37 is positioned within the bore 38 to communicate pilot fluid to the control valve through one of the conduits 27 and 28.

Preferably, each set of depressions 58 and 59 comprises circumferentially spaced apart indentations of relatively greater depth with axially extending deformations 61 of relatively lesser depth in the spool 37 interconnecting the angularly aligned and axially spaced apart depressions 58 and 59. Through this arrangement, the detent plungers 57 serve to prevent angular rotation of the spool 37 within its bore 38.

As noted above, the detent mechanism 52 is responsive to operation of the rotary valves 33 and 44 to release the detent engagement of the spool 37 and allow it to be returned to its neutral position as shown by the centering spring mechanism 39. The rotary valves 33 and 34 are of similar construction and accordingly only the components of one valve are described below, the similar components of the other valve being indicated by corresponding numerals. The valve 33 receives pilot fluid pressure from the inlet conduit 42 through a branched conduit 62. The valve includes a rotatable spool 63 forming both a pressure passage 64 and a vent passage 66 to provide selective communication between the branched inlet conduit 62, an outlet port 67 and a common drain conduit 68. Rotation of the spool 63 is controlled by a depending lever 69. Normally the spool 63 is positioned to communicate the outlet port 67 with the drain conduit 68 by means of the vent passage 66. However, as the lever 69 of the valve 33 is urged leftwardly by the cam 31, the spool 63 is rotated to a position where the pressure passage 64 communicates the inlet conduit 62 with the outlet port 67. The outlet port 67 of the valve 33 is in communication through a conduit 71 with the pilot control valve bore 38 through a port 72 which is generally in alignment with the depressions 58 when the spool is in its neutral position.

The other rotary valve 34 is similarly responsive to rightward movement of the cam 32 to communicate the branched conduit 62 through its outlet port 67 to another conduit 73. The conduit 73 is similarly in communication with the pilot control valve bore 38 through a port 74 which is generally in alignment with the depressions 59 when the spool 37 is in its neutral position. Through the positioning of the ports 72 and 74 and the arrangement of the axial deformation 61, it may be seen that the port 72 remains in communication with the inner ends of the radial bores 53 and 54 during retraction of the hydraulic jack 11. Maximum desired retraction of the jack 11 is indicated when the cam 31 engages the lever 69. Thereafter, the valve 33 communicates fluid pressure through the conduit 71. That fluid pressure is communicated through the port 72 and along the axial deformation 61 to act upon the inner ends of the plungers 57 and balance fluid pressure acting on the outer ends of the plungers 57 from the conduit 56. Accordingly, the spool 37 is free from detent engagement with the plungers 57 so that it may be returned to its neutral position shown in FIG. 1 by the centering spring mechanism 39.

Similarly, the port 74 remains in communication with the inner ends of the plungers 57 during extension of the hydraulic jack 11. Maximum extension is similarly signalled by engagement of the cam 32 with the lever 69 of the valve 34. Fluid pressure is communicated by the valve 34 through the conduit 73 and the port 74 to similarly act upon the inner ends of the detent plungers 57 and again permit the spool 57 to be returned to its centered position by the spring mechanism 39.

Another embodiment of the detent mechanism is illustrated in FIG. 2. The detent mechanism of that figure is substantially similar to the mechanism described above with reference to FIG. 1. Accordingly, components in the detent mechanism of FIG. 2 which correspond to components in FIG. 1 are indicated by similar primed numerals. Generally, the detent mechanism of FIG. 2 is modified to provide an automatic kickout function only when the spool 37' is shifted upwardly as viewed in the figures for engagement of the detent plungers 57' with the opposed depressions 59'.

It may be further seen that the detent mechanism of FIG. 2 does not include an inlet port corresponding to that shown at 74 in FIG. 1. When the spool 37' is moved downwardly to the position shown, the inlet port 72' is blocked from communication with the inner ends of the detent plungers 57'.

Due to the slidable fit of the spool 37' within the bore 38', it is possible for fluid pressure to develop against the inner ends of the plungers 57' by leakage. In order to prevent undesirable release of the detent plungers 57', any such fluid pressure developed by leakage is communicated through an axial groove 101 to a detent chamber 102 formed about a lower end of the spool 37'. The detent chamber is communicated to the reservoir 17 along a path partially formed by an internal passage 103.

It may of course be seen in FIG. 2 that when the spool 37' is shifted upwardly and thus conditions the control valve for retracting operation of the jack 11, kickout fluid pressure is communicated against the inner ends of the detent plungers 57' through the port 72' in a manner similar to that described above with reference to FIG. 1.

We claim:
1. A fluid motor in combination with a position responsive fluid control, including a hydraulic detent mechanism, comprising:
   a control valve defining a valve bore, said valve further defining a plurality of circumferentially spaced apart, opposed, radial bores communicating at their inner ends with the valve bore and at their outer ends with a common pressurized fluid conduit;
   an elongated spool axially movable in said valve bore for regulating fluid communication with said fluid motor and wherein a portion of the spool defines two sets of opposed radial depressions axially spaced apart;
   an imperforate detent plunger slidably arranged in each of the radial bores, the detent plungers tending to be urged into balanced detent engagement with the depressions in the spool by fluid pressure in the other ends of the radial bores;

detent kick-out means operable for selectively communicating fluid pressure into the inner ends of the radial bores and thereby tending to urge the detent plungers out of engagement with the spool; means for supplying fluid pressure to said common pressurized fluid conduit and to said detent kick-out means; and wherein the motor means comprising a hydraulic jack having a piston movable within a cylinder, the kick-out means being operatively associated with the jack and responsive to movement of the piston toward a preselected position in the cylinder.

2. A fluid motor in combination with a position responsive fluid control, including a pilot control valve for selectively communicating pilot fluid pressure through first and second conduits to a main control valve for regulating operation of said fluid motor, comprising:

a hydraulic jack;

a pilot valve body defining a valve bore;

an elongated pilot spool including resilient centering means tending to position the spool in a neutral condition, the spool being axially movable in opposite directions for communicating a source of fluid pressure with the first and second conduits respectively;

the valve body forming a plurality of circumferentially spaced apart, opposed radial bores communicating at their inner ends with the valve bore and at their outer ends with a common pressurized fluid conduit;

an imperforate detent plunger slidably arranged in each of the radial bores for balanced detent engagement with the spool under the influence of fluid pressure in the outer ends of the radial bores, a portion of the spool forming two sets of opposed radial depressions, each set of depressions being axially spaced from the other to receive the detent plungers when the spool is positioned to communicate fluid to each of the first and second passages; and means for supplying fluid pressure to said common pressurized fluid conduit and to said detent kick-out means; and detent kick-out means operable for selectively communicating fluid pressure into the inner ends of the radial bores wherein the detent kick-out means comprises a valve responsive to the position of the jack for communicating fluid to passage means communicating with the valve bore adjacent the radial passages.

3. The pilot control valve of claim 2 wherein the detent kick-out means comprises two valves responsive to extension and retraction respectively of the jack for communicating fluid through passage means in communication with the valve bore adjacent the radial passages.

4. The pilot control valve of claim 3 wherein the spool is of reduced thickness between the axially spaced depressions formed therein.

* * * * *